(12) United States Patent
Yu et al.

(10) Patent No.: US 8,954,570 B2
(45) Date of Patent: Feb. 10, 2015

(54) SYSTEM AND METHOD FOR ESTIMATING ORGANIC WEB TRAFFIC FROM A SECURED SOURCE

(75) Inventors: Jimmy Yu, Foster City, CA (US);
Sammy Yu, San Mateo, CA (US);
Lemuel Park, Cerritos, CA (US);
Lennon Liao, San Mateo, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 279 days.

(21) Appl. No.: 13/345,543

(22) Filed: Jan. 6, 2012

(65) Prior Publication Data

US 2013/0173783 A1 Jul. 4, 2013

Related U.S. Application Data

(60) Provisional application No. 61/581,961, filed on Dec. 30, 2011.

(51) Int. Cl.
*G06F 15/173* (2006.01)

(52) U.S. Cl.
USPC ........... 709/224; 709/203; 709/217; 709/219; 709/246; 707/706

(58) Field of Classification Search
USPC ................ 709/203, 217, 219, 223, 246, 224; 707/5, 222, 228, 706, 3, 6
See application file for complete search history.

(56) References Cited

U.S. PATENT DOCUMENTS

| | | | | |
|---|---|---|---|---|
| 7,716,201 B2 * | 5/2010 | Joshi | ............................. | 707/706 |
| 8,046,347 B2 * | 10/2011 | Joshi | ............................. | 707/706 |
| 8,126,881 B1 * | 2/2012 | Sethi et al. | .................... | 707/723 |
| 8,285,698 B2 * | 10/2012 | Grabarnik et al. | ............ | 707/706 |
| 8,417,697 B2 * | 4/2013 | Ghemawat et al. | ........... | 707/732 |
| 8,498,984 B1 * | 7/2013 | Hwang et al. | ................. | 707/731 |
| 8,560,456 B2 * | 10/2013 | Williams | ...................... | 709/201 |
| 8,595,252 B2 * | 11/2013 | Wu et al. | ....................... | 707/765 |
| 2005/0120233 A1 * | 6/2005 | Halcrow et al. | ............... | 713/193 |
| 2005/0283468 A1 * | 12/2005 | Kamvar et al. | ................... | 707/3 |
| 2005/0289140 A1 * | 12/2005 | Ford et al. | ........................ | 707/5 |

(Continued)

OTHER PUBLICATIONS

Bar-Joseph, Uri, "5 Tips for Handling (Not Provided) Data", Nov. 2012, Search Engine Watch, Accessed from: http://searchenginewatch.com/article/2227114/5-Tips-for-Handling-Not-Provided-Data.*

(Continued)

*Primary Examiner* — Ramy M Osman
(74) *Attorney, Agent, or Firm* — Maschoff Brennan

(57) ABSTRACT

One embodiment includes a method for estimating web traffic to a website. The method comprises obtaining a first set of reporting information from a secured external source that directs traffic to the website, the first set of reporting information having a corresponding portion of reporting information which is not provided from the secured external source, obtaining a second set of reporting information from a unsecured external source that directs traffic to the website, the second set of reporting information being different than the first set of reporting information, and generating an estimation of the corresponding portion of reporting information which is not provided from the secured external source by correlating the second set of reporting information with the first set of reporting information.

22 Claims, 10 Drawing Sheets

(56) References Cited

U.S. PATENT DOCUMENTS

| | | | |
|---|---|---|---|
| 2006/0129533 A1* | 6/2006 | Purvis | 707/3 |
| 2007/0255702 A1* | 11/2007 | Orme | 707/5 |
| 2008/0208815 A1* | 8/2008 | Taylor | 707/3 |
| 2008/0275876 A1* | 11/2008 | Kang et al. | 707/6 |
| 2009/0125381 A1* | 5/2009 | Delepet | 707/5 |
| 2010/0174709 A1* | 7/2010 | Hansen et al. | 707/728 |
| 2010/0287149 A1* | 11/2010 | Joshi | 707/706 |
| 2012/0030195 A1* | 2/2012 | Holt et al. | 707/722 |
| 2012/0278316 A1* | 11/2012 | Reznik | 707/722 |
| 2012/0321202 A1* | 12/2012 | Fertik et al. | 382/224 |
| 2013/0173574 A1* | 7/2013 | Park et al. | 707/706 |

OTHER PUBLICATIONS

Lee, Jessica, "Google '(Not Provided)' Traffic Highest for Tech Industry Brands at 56% [Study]", Aug. 2013, Search Engine Watch, Accessed from: http://searchenginewatch.com/article/2291379/Google-Not-Provided-Traffic-Highest-for-Tech-Industry-Brands-at-56-Study.*

Kohn, AJ, "Not Provided Keyword Not a Problem", published Nov. 21, 2011, www.blindfiveyearold.com.*

Audette, Adam, "3 Proposed Solutions for Regaining Lost SEO Query Data", published Dec. 8, 2011, www.rimmkaufman.com.*

\* cited by examiner

300 — Entity: www.macys.com
305 — Date: 12/05/2011
310 — Data Source: Google Analytic (Web Analytics Platform)

|        | Keywords          | Visits | Visits (%) | Avg. Time On Site |
|--------|-------------------|--------|------------|-------------------|
| 315    |                   | 316    | 317        | 318               |
| 320    | Baby Shoes        | 2,090  | 33%        | 00:03:12          |
| 321    | Calvin Klein Jeans| 1,120  | 18%        | 00:03:42          |
| 325    | (Not Provided)    | 905    | 15%        | 00:03:02          |
| 322    | Red Scarves       | 870    | 14%        | 00:04:36          |
| 323    | Blue Necktie      | 675    | 11%        | 00:02:24          |
| 324    | Macys Furniture   | 541    | 7%         | 00:01:02          |

*Fig. 3*

Entity: www.macys.com
Date: 12/05/2011
Data Source: Google Analytic (Web Analytics Platform)

| Estimated Keywords | Visits | Visits (%) |
|---|---|---|
| Baby Shoes | 299 | 33% |
| Calvin Klein Jeans | 163 | 18% |
| Red Scarves | 127 | 14% |
| Blue Necktie | 100 | 11% |
| Macys Furniture | 63 | 7% |

*Fig. 4B* — 450

| Estimated Organic Traffic | Visits |
|---|---|
| Baby Shoes | 2389 |
| Calvin Klein Jeans | 1283 |
| Red Scarves | 997 |
| Blue Necktie | 775 |
| Macys Furniture | 604 |

*Fig. 4C* — 460

SYSTEM AND METHOD FOR ESTIMATING ORGANIC WEB TRAFFIC FROM A SECURED SOURCE

CROSS-REFERENCE TO RELATED APPLICATIONS

This application claims priority to Provisional Application No. 61/581,961, entitled "SYSTEM AND METHOD FOR ESTIMATING ORGANIC WEB TRAFFIC FROM A SECURED SOURCE," which was filed Dec. 30, 2011, and said application is herein incorporated by reference in its entirety.

BACKGROUND

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Webpages for people to visit. Search engines, such as Google, Bing, Yahoo and others have come into being to help people find their way to Webpages that they desire. As a result, the number and types of channels that a marketer can leverage has also exploded—beyond organic and paid search, they can also leverage blogs, social media, video sharing, mobile content and ads, display ads, and many other channels.

Search engine optimization (SEO) has emerged as a means for collecting, storing, and analyzing search engine data using computing systems in order to provide meaningful recommendations to visibility or to report on the effectiveness of a website or a webpage in search engines. As such, SEO is implemented by Internet Technology (IT) professionals to improve the volume and quality of traffic to a given webpage or Internet site. Typical techniques used in SEO include collecting, tracking, or analyzing specific metrics which led a user from various channels to a particular site. These channels may include search engines, emails which include links to the website, other websites which include links or references to the particular site, including social media sites, advertisements, blogs, tweets, or the like. The metrics that may be tracked include keywords inputted into the search engine, keywords or other data obtained from parsing the source, or the like.

Recently, various websites including search engines and various social media websites have begun implementing increased privacy measures which shield or restrict the amount of data that is available to entities using traditional SEO. For example, rather than reporting what specific keywords were used in a search which resulted in a visit to a website, a search engine may only report that a search was performed without reporting which keywords were used in the search.

Without the reporting data on how those visitors using secured search or other channel using restricted reporting mechanisms arrived at the website, entities are unable to accurately track details concerning the reference that drove the visitor to come to the webpage and may be left with an incomplete evaluation of their webpage's performance from the external source. In particular, without directly crawling and analyzing the page where the visitor came from, there is a very inaccurate view into how the visitor got to a webpage, what was the entities performance in those external sources, and how a marketer should optimize their online marketing campaigns.

However, the ability to quantify the and track the various channels that brought visitors to a Webpage, along with the ability to correlate those channels to the visitors' actions once there, may have a significant impact on the success of the Webpage. For example, many Webpages rely on tracking a specific to bring in advertising revenue to sustain the Webpage or supplement the revenue that the Webpage brings in. Therefore, accurately determining specific channels that result in visitors, the ability to correlate those channels with the behavior of the visitors will help the marketer to focus on and optimize campaigns to bring additional revenue.

Additionally, tracking the behavior of the actions of each visitor would allow the Webpage to be marketed more efficiently. Without understanding key attributes of their performance on the search engine, they cannot accurately determine the effectiveness of their marketing efforts. Moreover, they cannot determine how their organic search marketing efforts would impact what those visitors do on the Webpage when they have found the Webpage. For example, if a Webpage is selling merchandise, there is currently no way to determine who completed a particular purchase on the Webpage and compare that with how that visitor came to the Webpage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A first embodiment of the invention is related to a method for estimating web traffic to a website. The method comprises obtaining a first set of reporting information from a secured external source that directs traffic to the website, the first set of reporting information having a corresponding portion of reporting information which is not provided from the secured external source, obtaining a second set of reporting information from a unsecured external source that directs traffic to the website, the second set of reporting information being different than the first set of reporting information, and generating an estimation of the corresponding portion of reporting information which is not provided from the secured external source by correlating the second set of reporting information with the first set of reporting information.

A second embodiment of the invention is related to a method for estimating web traffic to a website. The method includes obtaining a first set of reporting information from a secured external source that directs traffic to the website, the first set of reporting information having a corresponding portion of reporting information which is not provided from the secured external source, obtaining a second set of reporting information from a unsecured external source that directs traffic to the website, the second set of reporting information being different than the first set of reporting information, generating an estimation of the corresponding portion of reporting information which is not provided from the secured external source by correlating the second set of reporting information with the first set of reporting information, aggregating the estimation of the corresponding portion of reporting information which is not provided from the secured external source, the first set of reporting information, and the second set of reporting information to provide an estimate of total organic traffic, analyzing the estimate of the total organic traffic, and generating a report indicating the analysis of the estimate of the total organic traffic.

A third embodiment of the invention is related to a computer readable medium encoded with a computer program having computer-executable instructions for causing a computing system to perform operations for estimating web traffic to a website. The operations include obtaining a first set of reporting information from a secured external source that directs traffic to the website, the first set of reporting information having a corresponding portion of reporting information which is not provided from the secured external source, obtaining a second set of reporting information from a unsecured external source that directs traffic to the website, the second set of reporting information being different than the first set of reporting information, and generating an estimation of the corresponding portion of reporting information which is not provided from the secured external source by correlating the second set of reporting information with the first set of reporting information.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 3 is an example of a first set of reporting information which may be received from a secured external source which has a portion of information which has not been provided along with a second set of reporting information from a unsecured external source;

FIG. 4B is a illustrates an estimation of the organic traffic from the secured external source according to the embodiment shown in FIG. 4A;

FIG. 4C is a block diagram illustrating an estimation of the organic traffic from both the first and unsecured external source according to the embodiment shown in FIG. 4A;

DETAILED DESCRIPTION OF SOME EXAMPLE EMBODIMENTS

Figure 1:
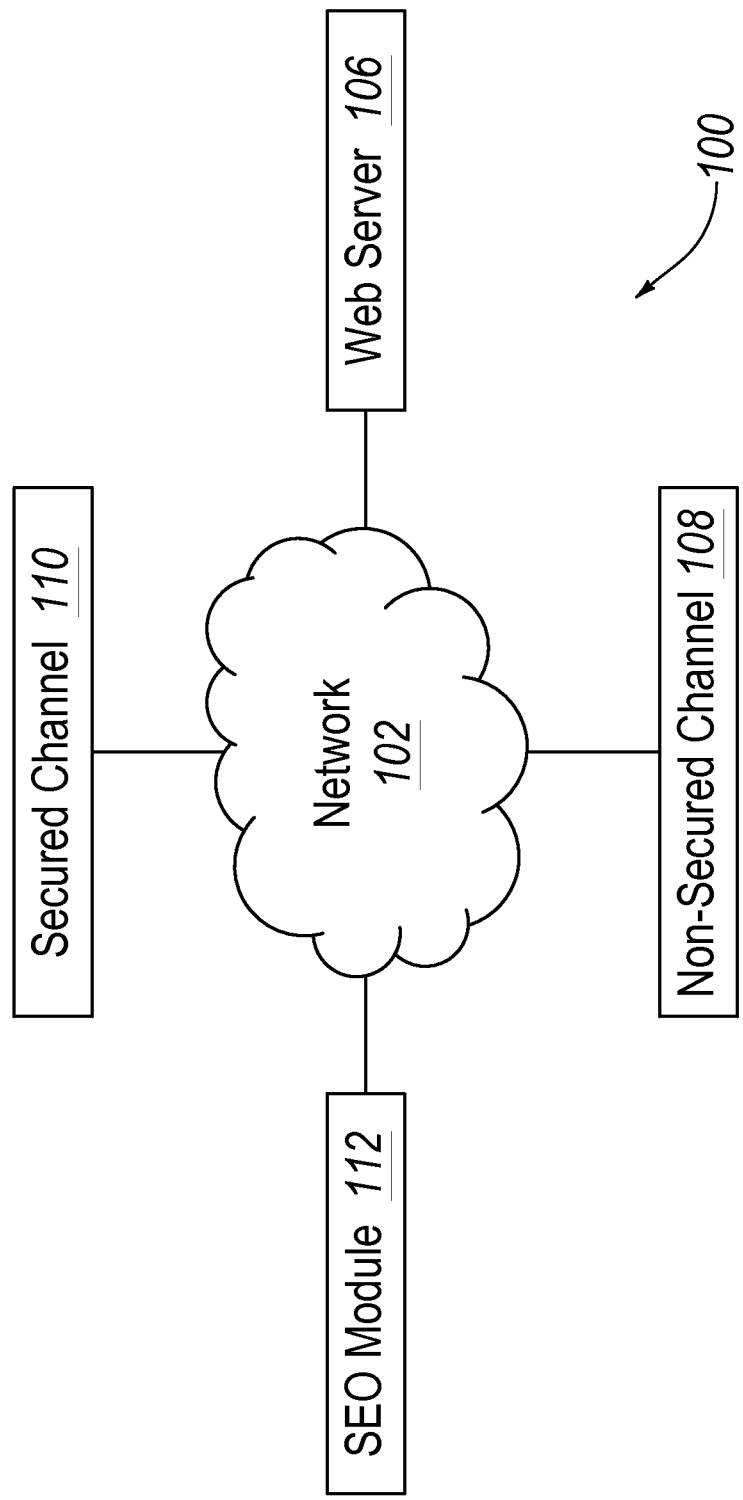
FIG. 1 illustrates a block diagram of a system for estimating organic web traffic to a webpage.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Recently search engines have begun to use secured searches and in particular secured organic searches. As described above, one difficulty that entities may have with secured searches is that the keywords or other referring circumstances which led the visitor to the website may be redacted from the reporting information. In addition to secured searches in organic search engines, some external sources which may refer a user to a website, including social media websites such as Facebook, Twitter, and the like may only report aggregated reporting information which contains only a subset of the desired information. For example, rather than reporting precisely which Facebook user clicked on a particular hyperlink housed within a Facebook page, an entity may only be able to determine via a specific Facebook API protocol that a certain number of Facebook users of a particular demographic, such as males between the ages of 18-30, we referred to the webpage. As described above, without more substantial reporting information, it may be difficult for an entity to meaningfully track the manner in which users arrive at their websites, making marketing decisions and optimization of their websites more difficult.

In contrast to external sources which only provide a subset of the desired reporting information, other external sources may provide a more complete set of reporting information. For example, searches performed through unsecured searches, such as through unsecured search engines provide more detailed reporting information as compared to the secured external sources described above. Other examples of more complete reporting information may be obtained through the use of toolbars such as the Google Toolbar. As described more fully below, one advantage of the embodiments described herein is the ability to use the more robust reporting information from unsecured channels to provide a meaningful estimation of the desired reporting information from the secured channels that is not provided. As is described below, a variety of different estimation methods may be used in association with the invention.

In the following description, the term "organic search" refers to a search or referral to a website or webpage which is initiated by a user who initiates the visit by searching for the webpage via a search engine, whether the search engine is a stand-alone website or is embedded within another website, such as a social media website, blog, or the like. Furthermore, as described below, the secured external source which provides only a subset of desired reporting information. As may be understood by one of skill in the art, the secured external source may be a secured search engine, a referring website, such as a social networking site or the like, which aggregates reporting information and/or performs privacy controls so as to remove or limit the amount of reporting information available to an entity. For example, in a secured organic search using a secured search engine, when a user selects a website or webpage from a secured search results page, the user is directed to the website or webpage by the secured search results page. The search engine may provide the entity with reporting information indicating that the incoming traffic was directed from a secured search results page, however, no further data may be transmitted to the website.

For the portion of visitors who are referred to a website through a search engine utilizing secured search, an entity associated with the website (including the website proprietor, webmaster, SEO manger, or the like) may be able to determine that the visitor came through a keyword search, but not determine the keywords used in keyword searches that drove traffic to the entity's website. A keyword may be any input used by a search engine to develop a search result webpage or list based on that keyword. The term "keyword" may refer to a single word, including numbers, symbols, or any combination of single words, numbers, and symbols.

In contrast, the unsecured external source described below provides a more robust amount of reporting information as compared to the secured external source. Examples of unsecured external sources include unsecured searches using search engines, where a user selects a website or webpage from an unsecured search results page. Typically, search engines are unsecured search engines such that when a visitor visits an entity's website, the entity may be able to determine some or all of the keywords used in the original keyword search that drove traffic to the entity's website. Thus, in these situations, the entity is provided with the keywords which resulted in the visit, which enable the entity to optimize their websites and their associated keywords to produce higher quantities of traffic and attribute revenue, herein termed "SEO revenue attribution", to keywords. Furthermore, the entity may have further optimized the website for the keywords to further increase or maintain the traffic generated by the keyword. However, as noted, with the introduction of secured search and limited reporting information, SEO revenue attribution has become more restricted.

Accordingly, embodiments disclosed herein generally relate to the use of computing systems and computing processes to perform, among other things, a method for determining revenue attributable to traffic from secured channels.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Operating Environment

FIG. 1 illustrates an operating environment, including a SEO system 100, which can include a network 102. In some embodiments, the network 102 can be used to connect the various parts of the system 100 to one another, such as between a web server 106, a unsecured channel 108, a secured external source 110, and a SEO module 112. It will be appreciated that while these components are shown as separate, the components may be combined as desired. Further, while one of each component is illustrated in FIG. 1, the system 100 may optionally include any number of each of the illustrated components.

The network 102 may include the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

The web server 106 can include any system capable of storing and transmitting a webpage to a user. The web server 106 can provide access to the webpages of a website to be analyzed for improving SEO. For example, the web server 106 can include a computer program that is responsible for accepting requests from clients (user agents such as web browsers), and serving them HTTP and HTTPS responses along with optional data contents, which can include HTML documents and linked objects for display to the user. Alternately or additionally, the web server 106 can include the capability of logging some detailed information, about client requests and server response, to log files.

In this description, the term "website" can include any number of webpages. The aggregation of references to the various webpages can be referred to as "traffic". References to a website or a webpage can include any reference to the webpages of a website which directs a visitor to the webpage. It should be noted that webpage as used herein refers to any online posting, including domains, subdomains, web posts, Uniform Resource Identifiers ("URIs"), Uniform Resource Locators ("URLs"), images, videos, or other piece of content and non-permanent postings such as e-mail and chat unless otherwise specified.

II. Method of Estimating Organic Web Traffic from a Secured Source

Figure 2:
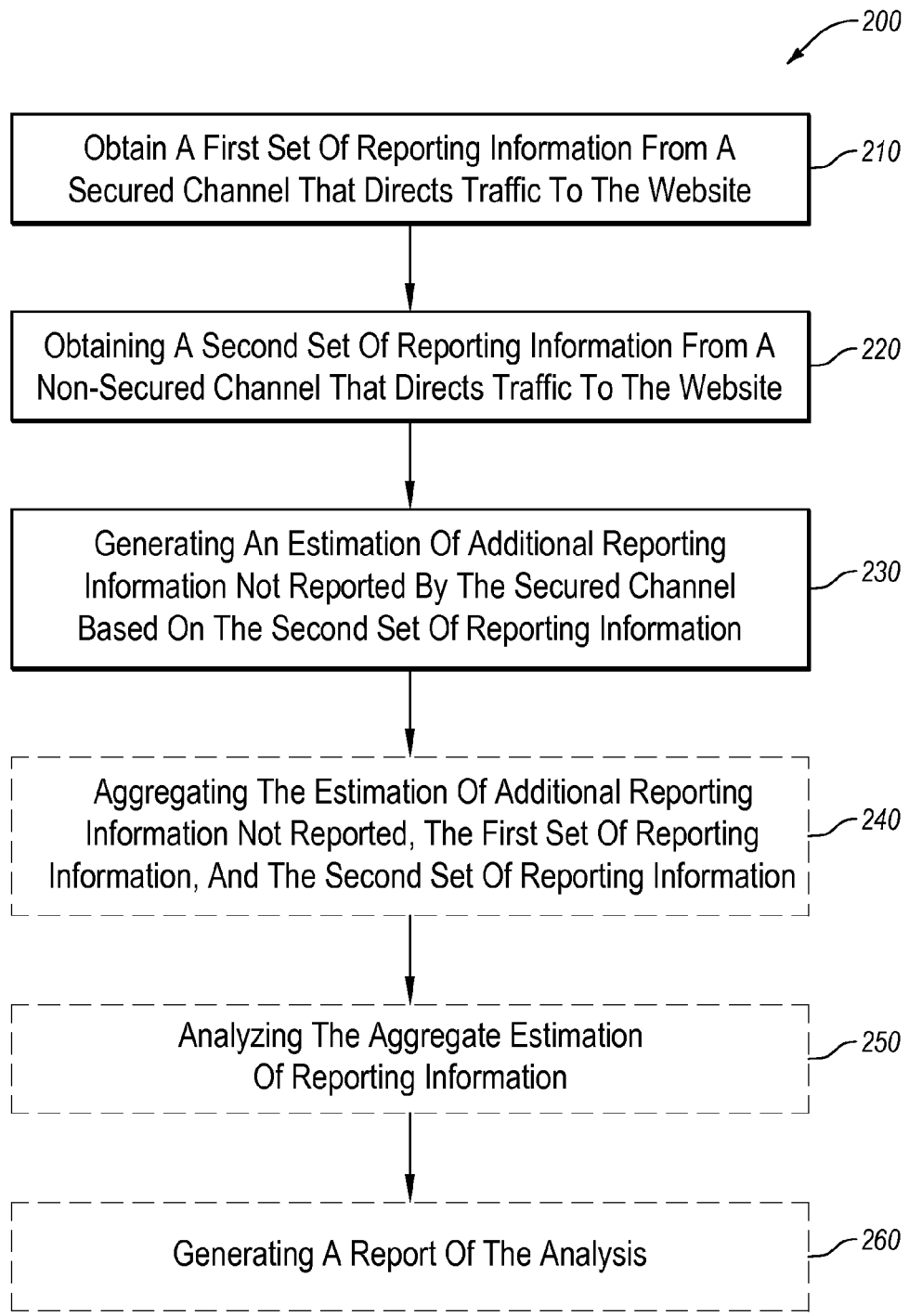
FIG. 2 is a flow diagram illustrating a method for estimating organic web traffic to a webpage.

FIG. 2 is a block diagram illustrating a method for estimating organic web traffic which may be performed with the embodiments described herein. At step 210, a first set of reporting information from a secured external source 110 that directs traffic to the website. Because the first set of reporting information is received from a secured external source 110, a secured portion of reporting information is not provided to the SEO module 121 from the secured external source 110. At step 220, a second set of reporting information is obtained from a unsecured external source 108 that directs traffic to the website, the second set of reporting information being different than the first set of reporting information. Furthermore because the second set of reporting information is received from the unsecured channel 108, the second set of reporting information may be more robust, although it is sufficient that the second set of reporting information provides a type of reporting information which is not provided by the first set of reporting information.

At step 230, the SEO module 112 generates an estimation of the reporting information which is not provided from the secured external source 110 by correlating the second set of reporting information with the first set of reporting information from the unsecured external source 108.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations, or expanded into additional steps and operations without detracting from the essence of the disclosed embodiments.

Furthermore, in some embodiments, the method of FIG. 2 may include additional process, such as aggregating the estimated reporting information with the first set of reporting information and second reporting information in order to obtain an estimation of all the organic traffic to the website at step 240. This aggregate organic traffic may then be analyzed at step 250 and reported to an entity at step 260.

In at least one implementation, analyzing the aggregate organic traffic comprises correlating external sources to a webpage with the number of conversions on the webpage can allow the webmaster to determine the number of conversions provided by each external source. This can, in turn, allow a webmaster to focus on increasing the number or quality of references that will best lead to an increased number of conversions on the webpage. For example, correlating keyword searches and the ranking of the webpage within the search results in search engines that include a reference to the webpage can allow a webmaster to focus on improving the ranking of the webpage in searches for identified keywords that are more likely to lead to a greater number of conversions.

In at least one implementation, conversions include a visitor to a webpage completing a desired action on the webpage. In particular, the nature of the desired action can include any desired use of the webpage. Webpages may be created and maintained for different purposes.

For example, in some instances the webpage can be designed for e-commerce. That is, the Webpage can be designed to allow a visitor to purchase certain products, such as products produced and/or sold by a manufacturer or other entity. In these instances, business metrics such as the average number of orders per conversion or the amount of revenue generated per visit from a specific keyword can be calculated, analyzed, and consequently optimized.

In other instances, webpages can be content driven. That is, the webpage can be designed to provide access to certain content without necessarily being designed for e-commerce. For example, the webpage can be designed to provide news, information, research help or any other content for the use of the visitor. One example would be a webpage of a news agency with is designed to provide news, but which generates revenue not through direct sales to visitors, but based on advertising revenue driven by the amount of traffic to the site. Alternately or additionally, a webpage can be designed to generate leads for a business without offering any goods for sale or without any associated direct advertising. For example, the webpage can include information regarding a manufacturer of a certain part and contact information, so that potential customers of the product can contact the manufacturer. Alternatively, a webpage could provide a listing of white papers generated about products created by the manufacturer in order to educate those in the industry as to various features or aspects of the product. In these instances, the entities may adopt a more advance approach to valuation and analysis and may perform a regression analysis based on the average cost per click value from a web search engine and compare it to a number of conversions such as visits, downloaded content, external references to content, comments on the website, requests for additional information, and the like. One of skill in the art will appreciate that a webpage can be designed to include one or more of these uses or any other use as desired by the webmaster.

II. Methods of Generating Estimation of Reporting Data From Secured Source Using Reporting Data from Unsecured Source As described above, the embodiments herein supplant or expand the incomplete reporting data from a secured source using a second set of reporting data form an unsecured source in order to provide an estimate to the incomplete reporting data from the secured source. Described herein are various embodiments capable of providing such estimates although the invention is not intended to be limited to the specific systems and methods described herein and others may be used without departing from the meaning or scope of the invention.

A. Website and Webpage Extrapolation

FIG. 3 illustrates aggregate reporting data which may be supplied to a SEO module 112 from both a secured source and an unsecured source. As shown in FIG. 3, a particular entity 300 may request reporting data from a specific data source 310. In this instance, the data source 310, "Google Analytics" provides an extensive amount of reporting information, including specific keywords 320-324 used in an unsecured search that resulted in visits to the entities website on a specific date 305. Additionally, the data includes the average time spent on the website 318, the percent of visits a particular keyword 315 generated and the number of visits 316. The reporting data also includes the results of a secured search at line 325, which indicates only the number of visits to the website which originated in secured searches for any combination of keywords.

In this example, 15% of all searches which resulted in visits to the entity's website were generated via secured searches. Unfortunately, that 15% represents a sizable number of visits about which very little information is known. For example, without knowing which keywords to attribute those visits from the secured site to, the entity may not properly value the keywords. Furthermore, as interest and concern for increased online privacy implementations grows, it is likely that the percentage of reporting data which has some removed or redacted portion of information will increase. This means that the entity will have an increasingly difficult time valuing and optimizing their web presence.

Figure 4A:
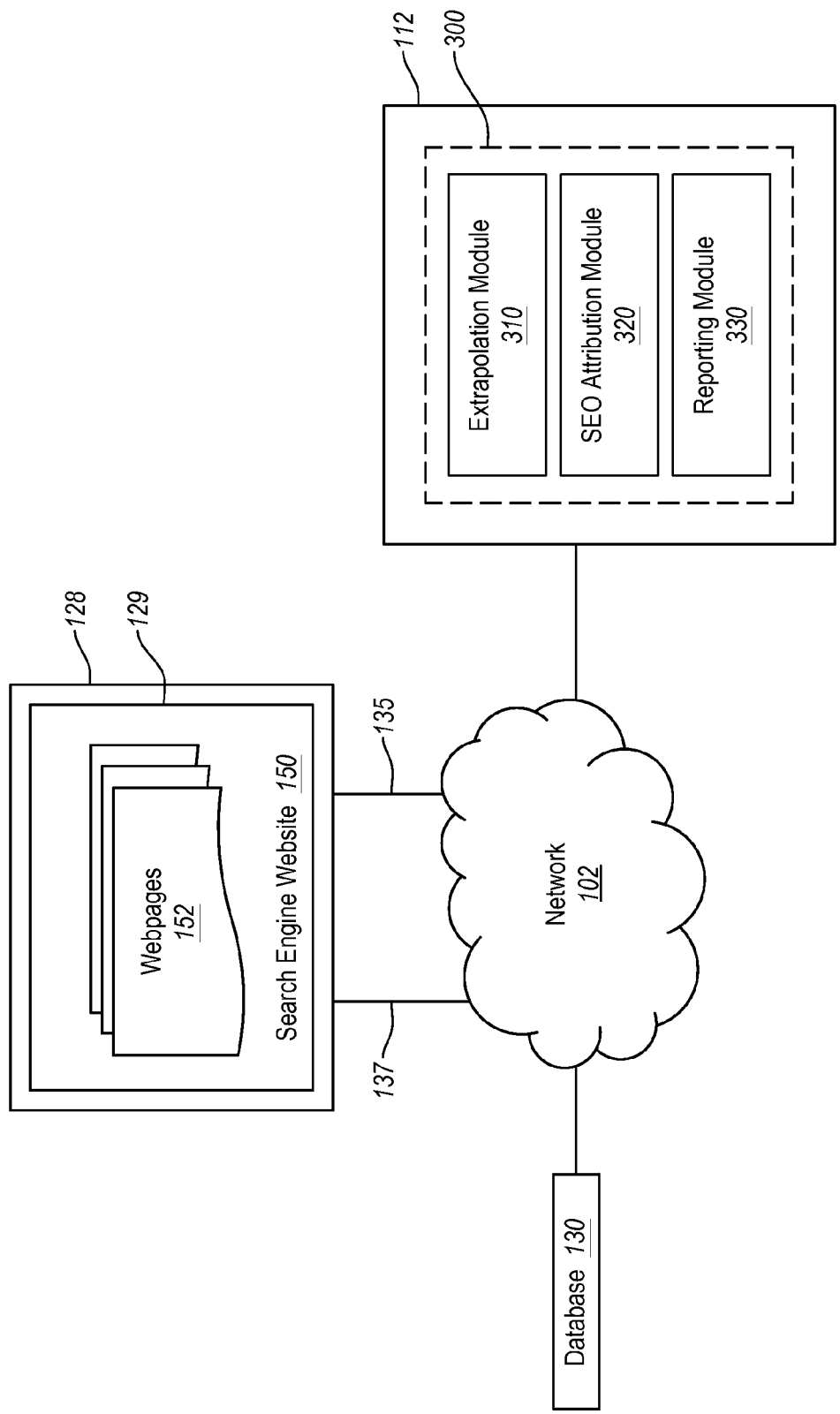
FIG. 4A is a block diagram illustrating one embodiment of the invention.

FIG. 4A illustrates on such SEO system which provides a meaningful estimation of the unreported information from the secured source. As shown, the network 102 operably couples the SEO module 112 with a website computing system 128. The SEO module 112 includes an SEO computing system 300 configured to perform SEO analysis and produce recommendations as described herein. The SEO computing system 300 can include submodules for implementing particular functionalities. The SEO computing system 300 can be generic to and, in this instance, includes an extrapolation module 310, a SEO revenue attribution module 320, and a reporting module 330.

The SEO module 112 may communicate with a website database 129 through the network 102. The website database 129 can include webpages 152, such as search result webpages, of the search engine website 150. The website database 129 can further include webpages 152 relating to statistical data for keyword driven traffic within the search engine website 140, such as a webpage within Google Adwords, or Google Webmaster Tools displaying statistical data for keyword driven searches. It should be understood that the data from the search engine result webpages 152 may be stored in any configuration without departing from the embodiments described herein.

The website computing system 128 can obtain SEO data from the search engine result webpages 152 by accessing the search engine website 150 through a web server, such as the web server 106 of FIG. 1. As discussed above with reference to FIG. 3, in this instance, a single search engine 150 provides two different modes of searching, secured search and a standard or unsecured search. The search engine 150 then aggregates the reporting information from both those modes of search and makes them available to the SEO module 112. As such, the same search engine 150 in this instance acts as the source or channel 137 for unsecured reporting data and the channel 145 for secured reporting data.

Referring again to the SEO computing module 120, the extrapolation module 310 can be configured to identify which, if any, of the secured reporting data is missing and then performs an extrapolation process based on the unsecured reporting data to augment or estimate the missing data. For example, while the secured reporting data 325 of FIG. 3 indicates the number of visits to a particular website form secured searches, the secured reporting data 325 fails to provide the specific keywords used on those searches. By performing an extrapolation based on the percentage of visits resulting from the top keywords 320-324 listed in the unsecured reporting data multiplied by the number of visits from the secured search, the extrapolation module 310 may estimate that an equivalent proportion of the secured searches resulted from those keywords as shown in the estimation 450 shown in FIG. 4B.

By aggregating this estimation data with the reporting data from the unsecured searches, the entity is given a more accurate estimation of how many total visits from both unsecured and secured channels could reasonably be attributed to those keywords in the estimation 460 shown in FIG. 4C.

to analyze the webpages 152 of the search engine website 150, obtain one or more metrics, SEO data, or both from the webpage 152. The ranking module 160 can include one or more algorithms for analyzing the data from the webpages 152. For example, in some embodiments, the ranking module 160 can analyze on-page data references to the entity webpages to identify the rank of the entity webpages within search result webpages 152 of the search engine website 150.

Based on the data from the extrapolation module 310 and the database 130 containing predetermined values, the SEO revenue attribution module 320 can be configured to determine an aggregate value for the traffic from the secured and unsecured sources. The SEO revenue attribution module 320 can include one or more algorithms for processing the obtained data. Based on the data from the database 130 containing predetermined values, the SEO revenue attribution module 320 can multiply the estimated number of visits with a predetermined value per visit to determine an aggregate value for the selected keyword. For example, if it is estimated that approximately 2389 visits were generated from the key word "Baby Shoes" and that visits to pages corresponding to "baby shoes" result in an average amount of sales of $4, the SEO revenue attribution module 320 may estimate that the keyword "baby shoes" generated almost $10,000 of revenue on Dec. 5, 2011.

A reporting module 350 can compile such information to generate a report of the SEO revenue attribution including the aggregate value for estimated traffic. The reporting module 350 can include one or more algorithms that can generate one or more reports relating to the aggregate value.

While this example illustrated the use of extrapolation based on reporting data for a website as a whole, similar methods could be used to estimate the keywords which resulted in visits to a particular webpage of the website. Furthermore, an entity may electively apply various scaling to this process in order to obtain a desired estimation. For example, rather than using the reporting data for the website as a whole or the specific reporting data relating only a single webpage of the website, the entity may base the extrapolation on meaningful groupings in order to ensure that there is a sufficient amount of reporting data to provide meaningful extrapolation. For example, reporting data from unsecured sources for all an entities webpages directed to shoes or a particular style of shoe could be used to provide a meaningful estimation of what the organic traffic data was from a secured source for a specific shoe.

Furthermore, while in this example same search engine website 150 acts as both the secured source and the unsecured source, it should be understood that two search engine websites may comprise the two sources. Furthermore, it should be understood that the embodiment described herein could also be applied for other non-search engine types of secured sources, such as a website or social network which supplies only a subset of desired information or only aggregate information, such as the Facebook marketing API discussed briefly above. In these instances, the secured reporting information may comprise aggregate information, such as "45 visits to your registered website came from users of our system between the ages of 18-30." While in traditional models this information would provide a very incomplete set of reporting information, by correlating this information with a second set of more robust reporting data from an unsecured source and performing extrapolation, it is possible to provide a meaningful estimation of the amount and value of the traffic from that secured search.

B. Estimation Based on Keyword Ranking in Secured Searches

Figure 5A:
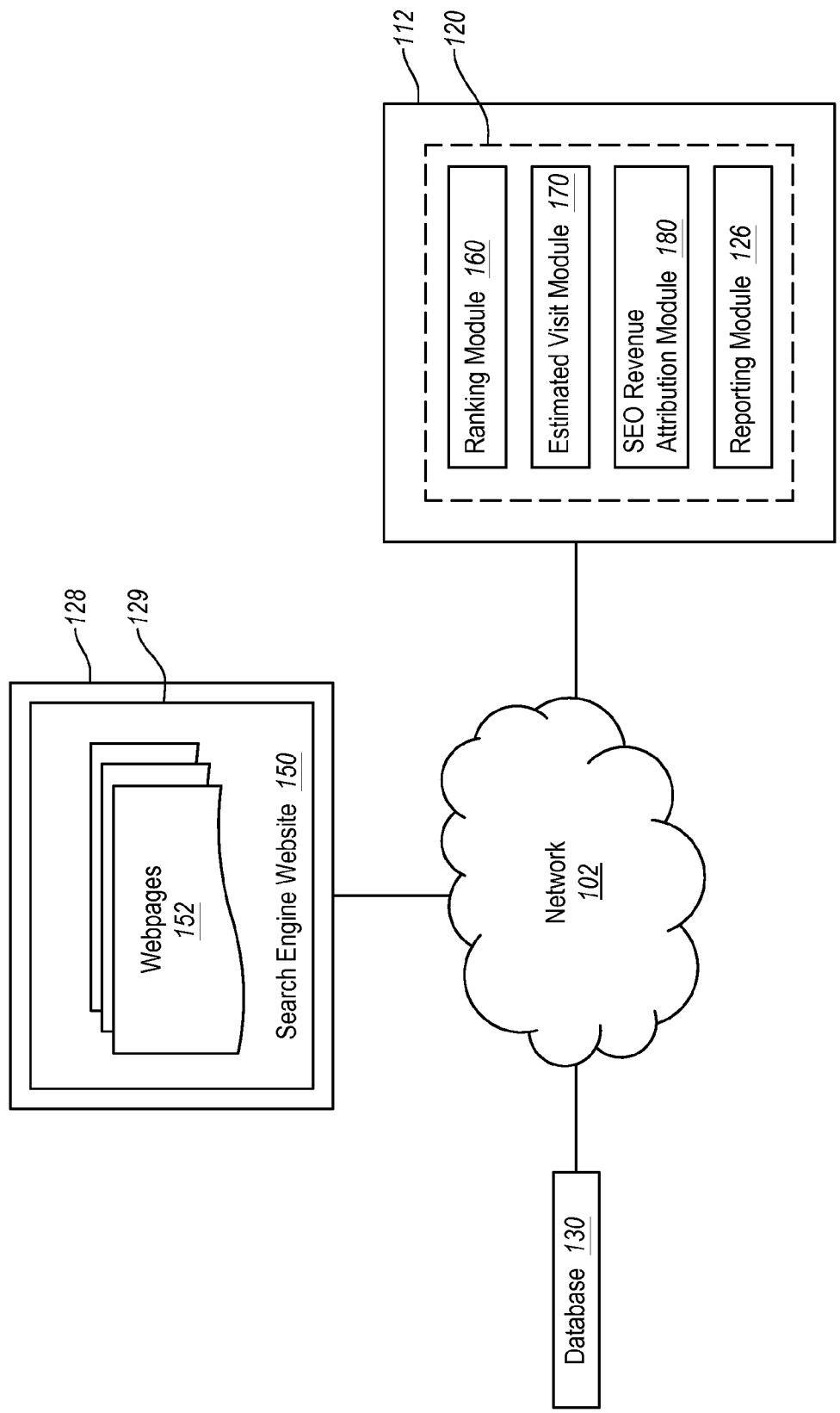
FIG. 5A is a block diagram illustrating a second embodiment of the invention.

FIG. 5A illustrates another embodiment of estimating the traffic of the secured searches. In this instance, the SEO module 112 includes an SEO computing system 120 configured to perform SEO analysis can include submodules for implementing particular functionalities, such as a ranking module 160, an estimated visit module 170, a SEO revenue attribution module 180, and a reporting module 126.

In this embodiment, the website computing system 128 can obtain SEO data from the search engine result webpages 152 by accessing the search engine website 150 through a web server by crawling the webpages 152. In some embodiments, the webpages 152 can be crawled using a deep index engine, for instance. In some embodiments, the webpages 152 can be crawled using a different mechanism.

Referring again to the SEO computing module 120, the ranking module 160 within the SEO computing module 120 can be configured to analyze the webpages 152 of the search engine website 150, obtain one or more metrics, SEO data, or both from the webpage 152. The ranking module 160 can include one or more algorithms for analyzing the data from the webpages 152. For example, in some embodiments, the ranking module 160 can analyze on-page data references to the entity webpages to identify the rank of the entity webpages within search result webpages 152 of the search engine website 150.

The estimated visit module 170 can obtain data from the ranking module 160 and the webpages 152, and can be configured to determine an estimated number of visits to a website resulting from a secured keyword search on the search engine website 150 using the selected keyword. The estimated visit module 170 can include one or more algorithms for processing the data obtained from the ranking module 160, the webpages 152 relating to keyword statistics, and the database 130 containing predetermined values.

The ranking module 160 may require that a sample of the top key words driving traffic to a website be obtained, from which a selected keyword is designated. For the selected keyword, a rank of the website within the organic keyword search is determined using the selected keyword.

Based on the data from the ranking module 160, the webpages 152 relating to keyword statistics, and the database 130 containing predetermined values, the estimated visit module 170 can determine a percentage value, herein termed a "Click Through Rate" (CTR) which represents the percentage of visits to an entity's website that will occur based on the rank of a webpage of the entity within the organic keyword search as discovered by the ranking module 160. The CTR is then used to determine an estimated number of visits to the website that result from secured searches of the keyword by the estimated visit module 170.

The SEO revenue attribution module 180 can obtain data from the estimated visit module 170, and from the database 130 containing predetermined values, and can be configured to determine an aggregate value for the selected keyword. The SEO revenue attribution module 180 can include one or more algorithms for processing the obtained data. Based on the data from the estimated visit module 170 and from the database 130 containing predetermined values, the SEO revenue attribution module 180 can multiply the estimated number of visits with a predetermined value per visit to determine an aggregate value for the selected keyword.

The reporting module 126 can compile information from the ranking module 160, and/or the estimated visit module 170, and/or the SEO revenue attribution module 180, to generate a report of the SEO revenue attribution including the aggregate value for the selected keyword. The reporting module 126 can include one or more algorithms that can generate one or more reports relating to the aggregate value.

Figure 5B:
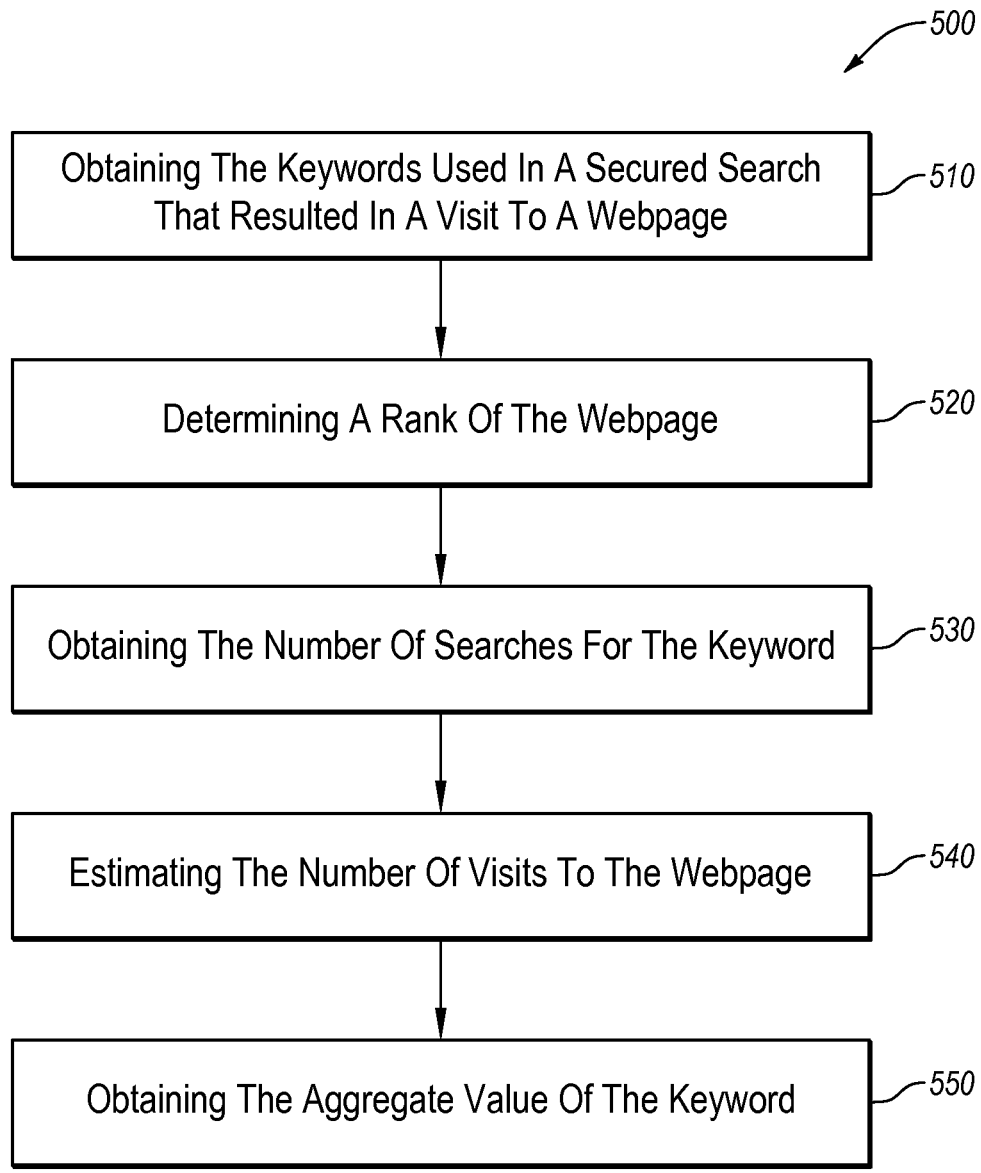
FIG. 5B is a block diagram illustrating a method for generating an estimation of the organic traffic from the secured external source according to the embodiment shown in FIG. 5A.

FIG. 5B illustrates a method for determining revenue attributable to keywords used in a secured search that may be performed by a computing system, such as the SEO module 112 of FIG. 5A. In some embodiments, as shown in FIG. 5B, the method 500 may include the steps of obtaining the keywords used in a secured search that resulted in a visit to a webpage (block 510), determining a rank of the webpage on a search results page resulting from securely searching the keyword; (block 520), obtaining the number of secured searches for the keyword (block 530), estimating, based on the rank of the webpage, a number of visits to the website that result from secured searches of the keyword (block 540), and obtaining the aggregate value of the keyword (block 550).

C. Estimation Based on Toolbar/Panel Program

In some instances, while a user may use a search engine 605 which performs secured searches and hence is a secured channel 155 which provides only a subset of reporting information to the SEO module 112, the same or other users may simultaneously use a toolbar or panel program 607 to initiate the search. In these instances, the operator of the toolbar or panel program 607 may have a relationship with the SEO module 112 such that the keyword or other desired reporting information may be supplied to the SEO module 112 from the toolbar or panel program 607 rather than the search engine 610 through an unsecured channel 157.

In this instance, the toolbar/panel program 607 may provide information as to what keywords a user search with via a secured search channel to the SEO module. In some instances this may provide full visibility of as to the keywords used in secured searches, such that the reporting data from the two sources 605 and 607 need only be correlated by a correlation module 610 of a computing module 600 before it is analyzed for revenue attribution and reported by a SEO revenue attribution module 620 and a reporting module 630, respectively.

Figure 6A:
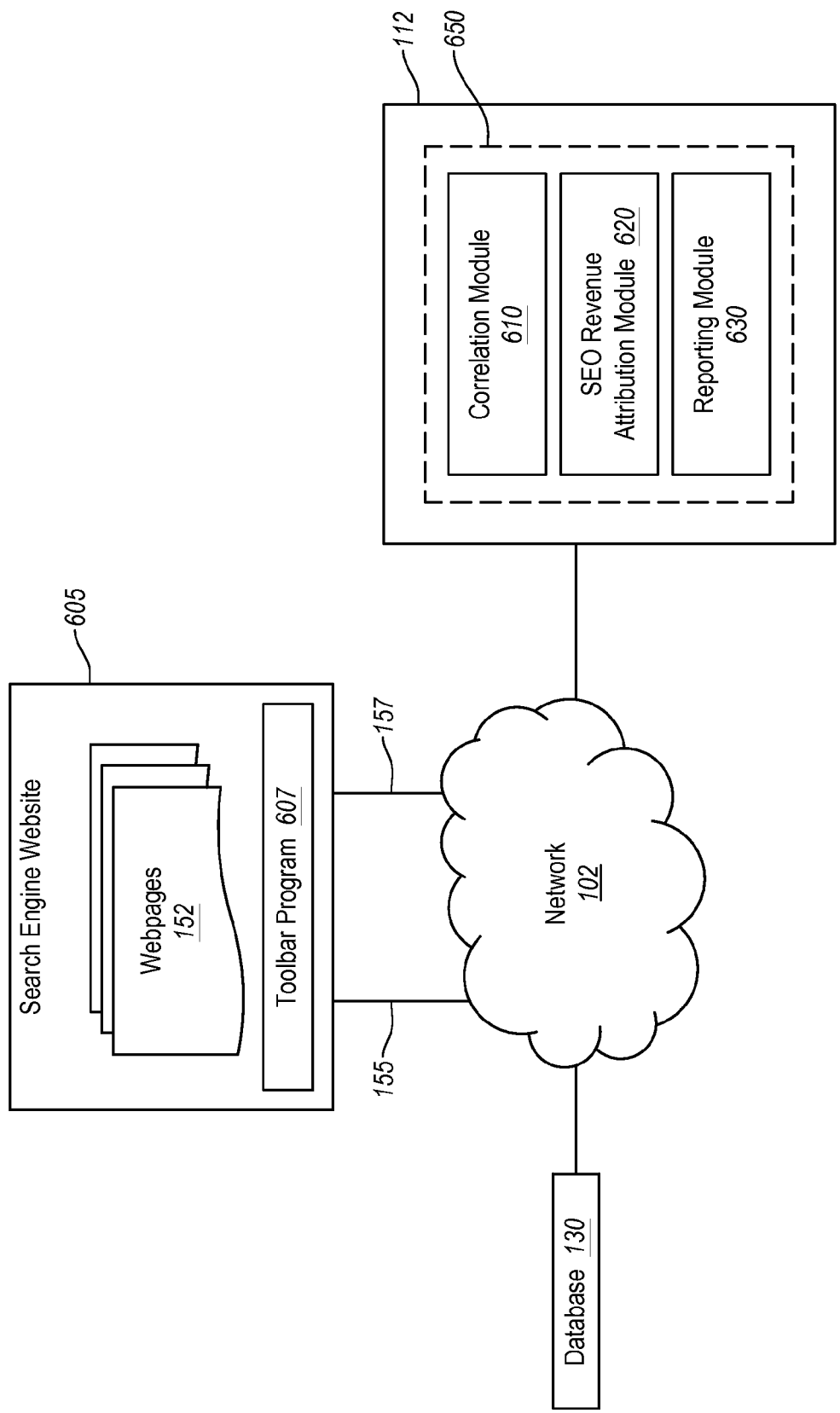
FIG. 6A is a block diagram illustrating a third embodiment of the invention.
Figures 6B, 6C:
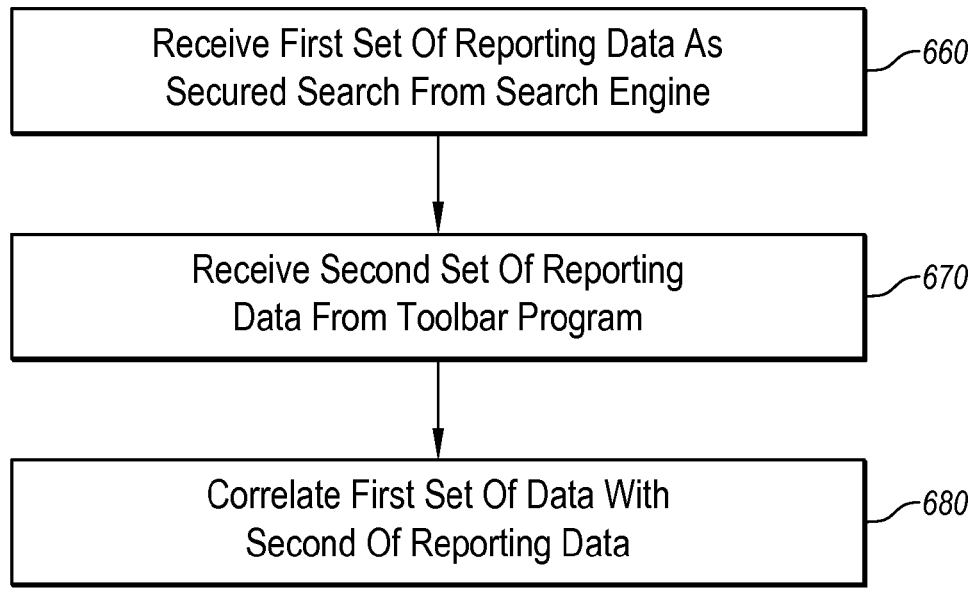
FIG. 6B is a block diagram illustrating a method for generating an estimation of the organic traffic from the secured external source according to the embodiment shown in FIG. 6A.
FIG. 6C is a illustrates an estimation of the organic traffic from the secured external source according to the embodiment shown in FIG. 6A.

FIGS. 6B and 6C illustrate such an example. In the method illustrated in FIG. 6B, the first set of data is received from the secured source at step 660 via channel 155 such as from the secured search engine 605. Subsequently, a second set of reporting data is received from unsecured toolbar program 607 via channel 157 at step 670. Then, at step 680, the first set of data is correlated with the second set of reporting data in order to generate aggregate reporting data 685, such as shown in FIG. 6C.

In the description above, the unsecured toolbar program 607 offers full visibility. In other instances, the reporting data form the toolbar panel program 607 may offer additional data similar to an unsecured search engine which may be used to supplant the secured reporting data from the secured search engine 605 using, for instance, one of the methods described above.

As may be understood by one of skill in the art, other methods for estimating the amount and value of traffic from a secured channel may be used and the embodiments described herein are meant to be illustrative only.

Some embodiments described herein include a computer program product having computer-executable instructions for causing a computing system having the computer program product to perform a computing method of the computer-executable instructions for obtaining revenue attribution to keywords driving traffic to webpages within a website. The computing method can be any method described herein as performed by a computing system. The computer program product can be located on a computer memory device, which may be removable or integrated with the computing system.

Some embodiments described herein include a computing system capable of performing the methods described herein. As such, the computing system can include a memory device that has the computer executable instructions for performing the method.

In some embodiments, a computing device, such as a computer or memory device of a computer, can include the SEO module, the ranking module, the estimated visit module, the SEO revenue attribution module, and the reporting module. The SEO module, the ranking module, the estimated visit module, the SEO revenue attribution module, and the reporting module can be configured to perform any of the methods described herein.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 7:
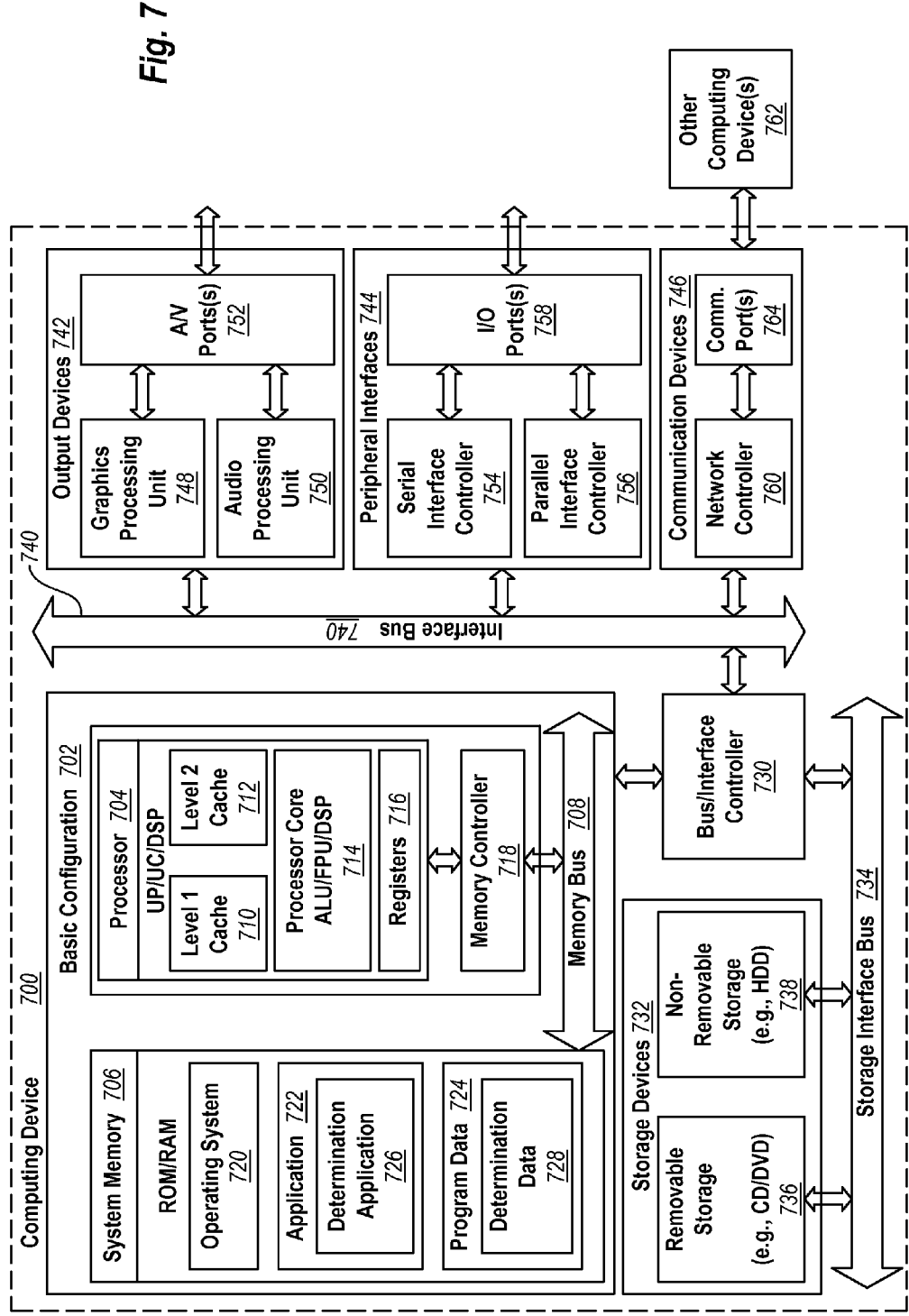
FIG. 7 illustrates an embodiment of a computing system that can implement some of the embodiments described herein.

FIG. 7 shows an example computing device 700 that is arranged to perform any of the computing methods described herein. In a very basic configuration 702, computing device 700 generally includes one or more processors 704 and a system memory 706. A memory bus 708 may be used for communicating between processor 704 and system memory 706.

Depending on the desired configuration, processor 704 may be of any type including but not limited to a microprocessor ($\mu$P), a microcontroller ($\mu$C), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a determination application 726 that is arranged to perform the functions as described herein including those described with respect to methods described herein. Program Data 724 may include determination information 728 that may be useful for analyzing webpage rank within a search engine results page. In some embodiments, application 722 may be arranged to operate with program data 724 on operating system 720 such that the work performed, such as the carrying out of the methods described, by untrusted computing nodes can be verified. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations. The computing device 700 can also be any type of network computing device. The computing device 700 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein can implement the functionalities associated with the name of the module or component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for estimating web traffic to a website using a processor-based computing device programmed to perform a method by the processor-based computing device executing a method stored in a non-transitory tangible storage medium, the method comprising:
obtaining a subset of first set of reporting information from a secured external source that directs traffic to the website, the subset of reporting information having a corresponding portion of secured reporting information in the first set of reporting information which is known by the secured external source but which is not provided from the secured external source, wherein the secured external source is a secured search engine and the subset of reporting information is secured search results and comprises a keyword;
obtaining a second set of reporting information from a unsecured external source that directs traffic to the website by performing a search using the keyword of the subset of first reporting information, the second set of reporting information being different than the subset of reporting information; and
generating an estimation of the corresponding portion of secured reporting information which is not provided from the secured external source by correlating the second set of reporting information with the subset of reporting information.

2. The method of claim 1, wherein the unsecured external source is a unsecured search engine or a toolbar search program.

3. The method of claim 1, wherein generating an estimation of the corresponding portion of reporting information which is not provided from the secured external source comprises performing an extrapolation process to obtain the estimation based on the second set of reporting information.

4. The method of claim 1, wherein the method estimates web traffic to a webpage of the website, wherein the secured external source and second external direct traffic to the webpage of the website.

5. The method of claim 1, wherein the second set of reporting information includes a rank of a webpage of the website resulting from searching the keyword using the unsecured external source, and estimating the rank of the webpage, based on a number of visits to the website that result from secured searches of the keyword.

6. The method of claim 1, further comprising obtaining an estimated revenue value of the traffic from the secured external source based on a revenue value of traffic from the unsecured external source.

7. The method of claim 1, further comprising obtaining an estimated number of conversions of the traffic from the secured external source based on a number of conversions from the traffic from the unsecured external source.

8. The method of claim 1, wherein analyzing the estimate of the total organic traffic comprises obtaining an estimated number of conversions of the estimated of the total organic traffic based on a number of conversions from the traffic from the unsecured external source, wherein generating the report includes generating a report indicating the estimate of the number of conversions of the total organic traffic.

9. The method of claim 1, further comprising obtaining an estimated revenue value of the traffic from the secured external source based on a revenue value of traffic from the unsecured external source.

10. The method of claim 1, further comprising obtaining an estimated number of conversions of the traffic from the secured external source based on a number of conversions from the traffic from the unsecured external source.

11. A method for estimating web traffic to a website using a processor-based computing device programmed to perform a method by the processor-based computing device executing a method stored in a non-transitory tangible storage medium, the method comprising:
   obtaining a subset of first set of reporting information from a secured external source that directs traffic to the website, the subset of reporting information having a corresponding portion of secured reporting information in the first set of reporting information which is known by the secured external source but which is not provided from the secured external source, wherein the secured external source is a secured search engine and the subset of reporting information is secured search results and comprises a keyword;
   obtaining a second set of reporting information from a unsecured external source that directs traffic to the website by performing a search using the keyword of the subset of first reporting information, the second set of reporting information being different than the subset of reporting information; and
   generating an estimation of the corresponding portion of secured reporting information which is not provided from the secured external source by correlating the second set of reporting information with the subset of reporting information;
   aggregating the estimation of the corresponding portion of reporting information which is not provided from the secured external source, the first set of reporting information, and the second set of reporting information to provide an estimate of total organic traffic;
   analyzing the estimate of the total organic traffic; and
   generating a report indicating the analysis of the estimate of the total organic traffic.

12. The method of claim 11, wherein the unsecured external source is a unsecured search engine or a toolbar search program.

13. The method of claim 11, wherein generating an estimation of the corresponding portion of reporting information which is not provided from the secured external source comprises performing an extrapolation process to obtain the estimation based on the second set of reporting information.

14. The method of claim 11, wherein the method estimates web traffic to a webpage of the website, wherein the secured external source and second external direct traffic to the webpage of the website.

15. The method of claim 11, the second set of reporting information includes a rank of a webpage of the website resulting from searching the keyword using the unsecured external source, and estimating the rank of the webpage, based on a number of visits to the website that result from secured searches of the keyword.

16. The method of claim 11, wherein analyzing the estimate of the total organic traffic comprises obtaining an estimated revenue value of the estimate of total organic traffic based on a revenue value of traffic from the unsecured external source, wherein generating the report includes generating a report indicating the estimate of the value of the total organic traffic.

17. A non-transitory computer readable medium encoded with a computer program having computer-executable instructions for causing a computing system to perform operations for estimating web traffic to a website, the operations comprising:
   obtaining a subset of first set of reporting information from a secured external source that directs traffic to the website, the subset of reporting information having a corresponding portion of secured reporting information in the first set of reporting information which is known by the secured external source but which is not provided from the secured external source, wherein the secured external source is a secured search engine and the subset of reporting information is secured search results and comprises a keyword;
   obtaining a second set of reporting information from a unsecured external source that directs traffic to the website by performing a search using the keyword of the subset of first reporting information, the second set of reporting information being different than the subset of reporting information; and
   generating an estimation of the corresponding portion of secured reporting information which is not provided from the secured external source by correlating the second set of reporting information with the subset of reporting information.

18. A non-transitory computer readable medium of claim 17, wherein the unsecured external source is a unsecured search engine or a toolbar search program.

19. A non-transitory computer readable medium of claim 17, wherein generating an estimation of the corresponding portion of reporting information which is not provided from the secured external source comprises performing an extrapolation process to obtain the estimation based on the second set of reporting information.

20. A non-transitory computer readable medium of claim 17, wherein the method estimates web traffic to a webpage of the website, wherein the secured external source and second external direct traffic to the webpage of the website.

21. A non-transitory computer readable medium of claim 17, wherein the second set of reporting information includes a rank of a webpage of the website resulting from searching the keyword using the unsecured external source, and estimating the rank of the webpage, based on a number of visits to the website that result from secured searches of the keyword.

22. A non-transitory computer readable medium of claim 17, wherein the computer readable medium comprises a memory device of a computing system.

\* \* \* \* \*